Aug. 5, 1952  C. R. L. JOHNSON  2,606,057
TELESCOPING PULL-OUT SIDE FOR TRAILERS
Filed Oct. 26, 1948  4 Sheets-Sheet 4

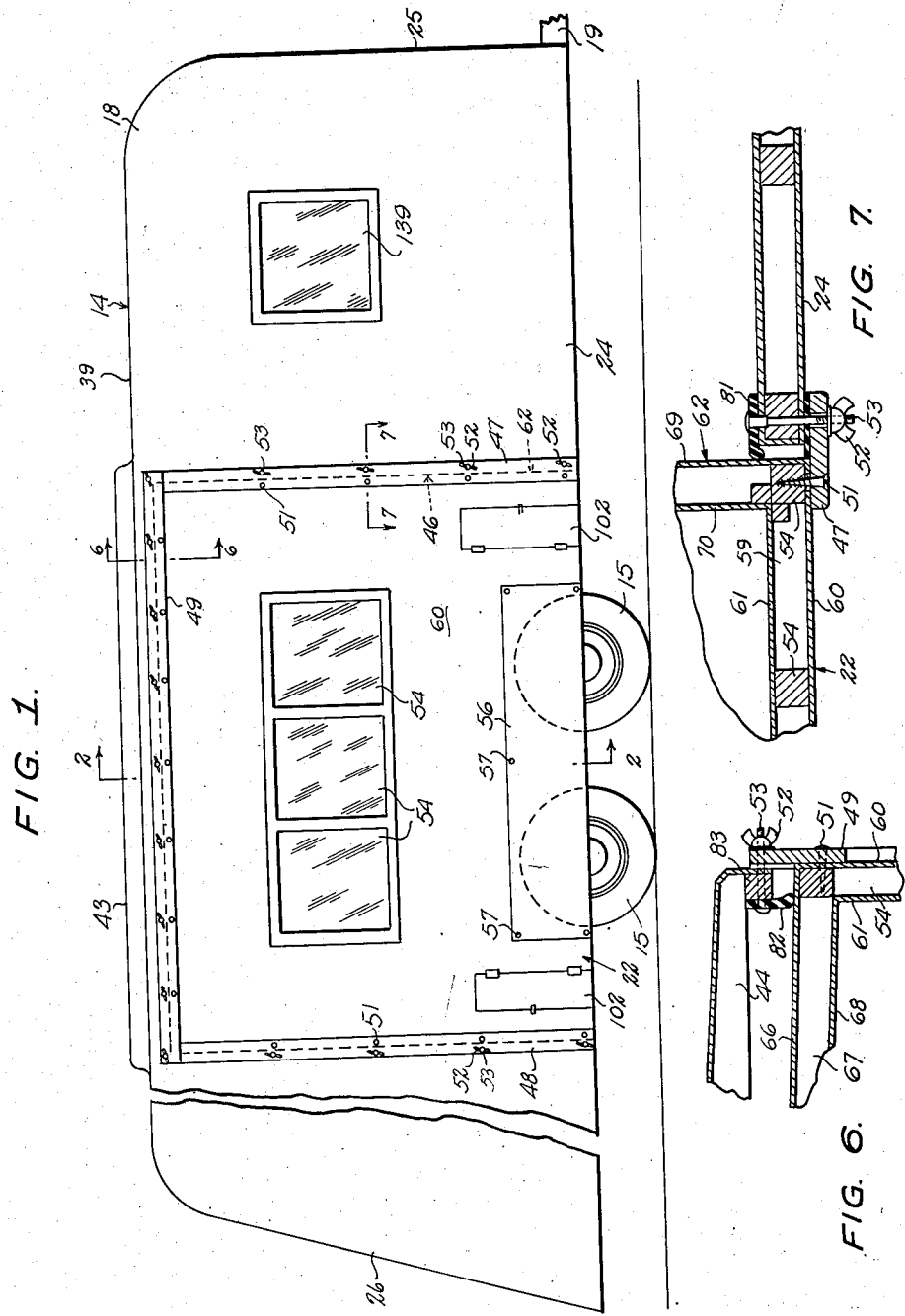

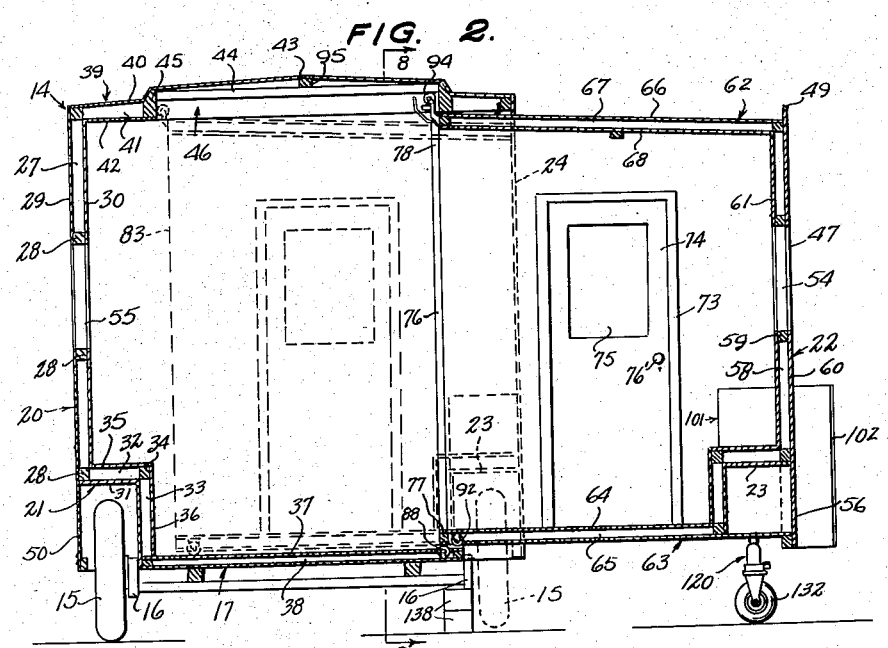

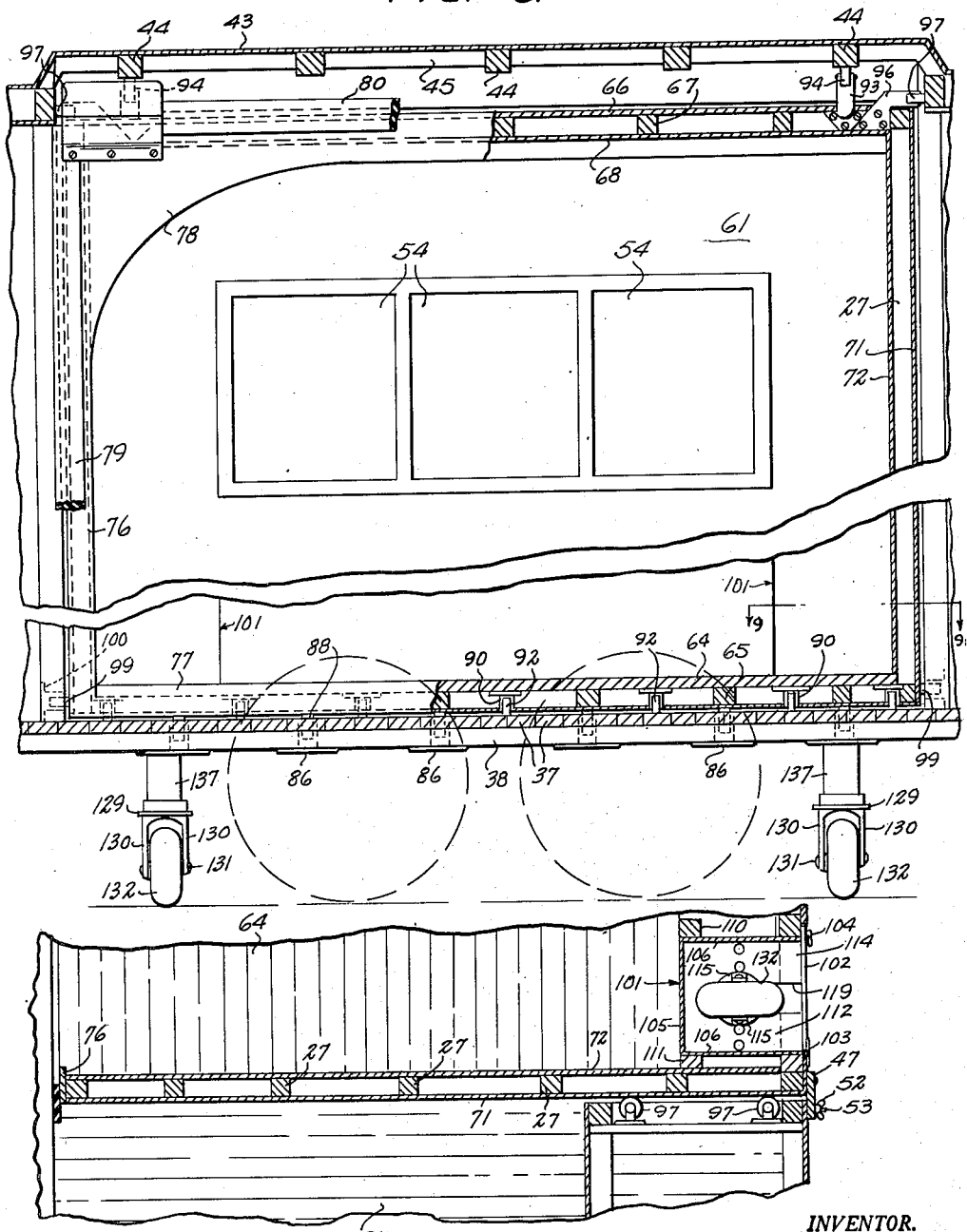

INVENTOR.
CHARLES R. L. JOHNSON,
BY
McMorrow, Berman + Davidson
ATTORNEYS.

Patented Aug. 5, 1952

2,606,057

UNITED STATES PATENT OFFICE 2,606,057

TELESCOPING PULL-OUT SIDE FOR TRAILERS

Charles R. L. Johnson, Woodward, Okla.

Application October 26, 1948, Serial No. 56,543

3 Claims. (Cl. 296—23)

This invention relates to trailers and extensions therefor, and particularly for telescoping pull-out sides for trailers.

The main object of my invention is to provide a trailer with a telescoping side portion or chamber which may be pulled out or extended to enlarge and widen a chamber in the trailer.

Another object is to provide the telescoping side portion of the trailer with extensible supporting wheels for supporting the side portion when the latter occupies a pulled-out or extended position.

A further object is to provide a trailer and the telescoping side portion thereof with guide rails and rollers to facilitate pulling out and telescoping of the telescoping side portion with respect to the main portion of the trailer.

It is also an object to provide the trailer and the telescoping side portion thereof with resilient insulating members or battens to prevent entry of rain or the like between them, and the telescoping side portion with a closure plate forming a seal for the trailer when the side portion is telescoped or withdrawn into it.

An additional object is to employ light wood strips with plywood or metal bars or strips with light sheet metal for constructing the trailer and the telescoping side portion thereof to produce a light and strong structure.

Further objects and advantages of my invention will appear in further detail as the specification proceeds.

In order to facilitate ready comprehension of this invention for a proper appreciation of the salient features thereof, the invention is illustrated on the accompanying drawing forming part hereof, and in which:

Figure 1 is a side elevation of a trailer having a telescoping and extensible side portion made according to the invention and embodying the same in a practical form;

Figure 2 is a transverse section of the trailer and telescoping side portion when pulled out or extended, the section being taken on line 2—2 in Figure 1;

Figure 3 is an enlarged fragmentary section of the mutually-adjacent floor portions of the trailer and the telescoping side portion;

Figure 4 is a fragmentary enlarged section of the roof portion of the trailer as seen in Figure 2 and a portion of the roof of the telescoping portion in extended position;

Figure 5 is an enlarged fragmentary section taken on line 5—5 in Figure 4;

Figure 6 is an enlarged fragmentary detail in section taken on line 6—6 in Figure 1 to illustrate insulation;

Figure 7 is another enlarged fragmentary section, taken on line 7—7 in Figure 1, showing detail referring to insulation;

Figure 8 is a vertical section on an enlarged scale taken on line 8—8 in Figure 2;

Figure 9 is a transverse section taken on line 9—9 in Figure 8;

Throughout the views the same reference numerals indicate the same or like parts.

Figure 10:
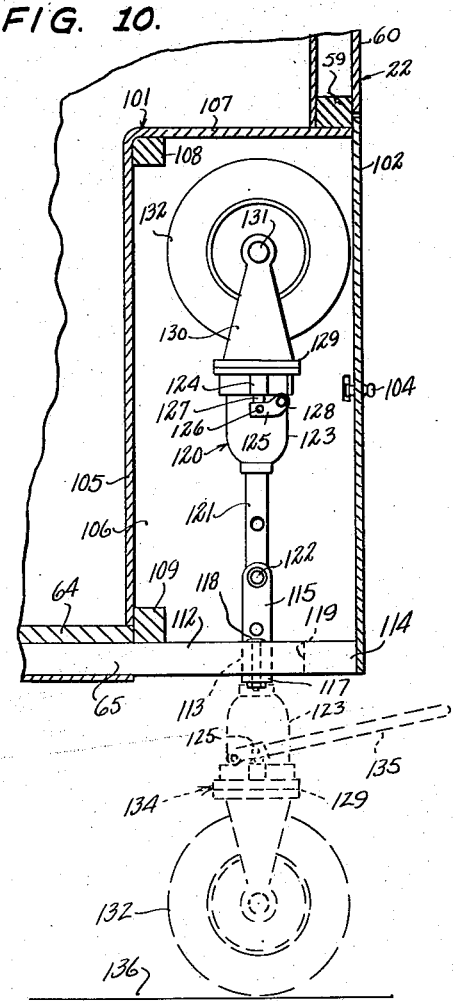
Figure 10 is an enlarged fragmentary detail section on an enlarged scale, illustrating a retractable supporting wheel for the telescoping side portion of the trailer.

Trailers having become popular, the question of space available within the same limits the number of people who may conveniently use the trailer involved, and frequently hampers the movements and work of the "trailerites." In fact, the equipment of a typical trailer must also be limited in view of the space limitations ordinarily imposed by the unalterable capacity of a trailer.

Upon considering this problem, it has occurred to me that although a trailer is transportable, it should nonetheless be capable of being extended or enlarged when a trailer camp or other selected site is reached in order to make the trailer more spacious and livable. As a result, I have found it quite feasible to produce a trailer having an extensible telescoping side portion for enlarging the capacity and available space in the trailer at will, as will now be more fully described.

Hence, in the practice of my invention, and referring again to the accompanying drawings, a trailer outer body, generally indicated at 14, is provided with two pairs of supporting wheels 15, 15 on each side mounted on spring-and-axle structures 16, 16 secured beneath the floor 17 of the trailer, while at the forward end 18 a hitch 19, only partly shown, serves to connect the trailer to the rear end of an automobile. In order to accommodate the wheels 15, 15 within the outline of the trailer, the latter is provided in the side walls 20 with a wheel box or well 21, the wall 22, referring to a part about to be described, having a corresponding wheel box or well 23. The wall 20 (Figure 2) in common with the wall 24 opposite thereto (Figure 1), as well as the front and rear walls 25 and 26, includes a spaced group of vertical studs or stringers 27, 27, best seen in Figure 9, and groups of vertically-spaced horizontal studs 28, 28 having an outer sheath 29 of plywood or sheet metal and provided with an interior wall sheet of plywood or metal 30 resulting in a light yet strong structure serving as a wall in each case with sufficient body to resist strains and impacts. The wheel box structure 21, is similarly constructed with the lower outer wall sheets 31, the interior spacing studs 32, 33, 34 and inner wall sheets 35, 36. A similar construction as just now outlined for the wall 20 also holds for the opposite wall 24 and the end walls 25 and 26, such structure per se being more or less conventional and practical for the purpose.

The floor 17 of the trailer is, of course, typical, including the floor boards supported by the bottom floor studs or beams 38. The roof 39 includes the outer sheeting 40, the roof stringers 41 and the interior roof plywood or sheet metal 42. An intermediate portion of the roof 39 is raised or peaked at 43 supported by transverse bars or rails 44 connected to a roof frame 45 surrounding and defining an opening indicated at 46, now to be described.

In the wall 24 is an arch portion indicated at 46 intermediately disposed and normally covered by a flange or frame consisting of the vertical plates 47, 48 and the upper horizontal plate 49 secured to an intermediate wall section 22 by means of screws, nails or rivets 51, 51 and detachably connected to the wall sections of wall 24 by means of a series of wing nuts 52, 52 screwed upon the outer threaded ends of bolts 53, 53 projecting from wall 24 about the arch 46. The mentioned intermediate wall section 22 is similarly constructed to the structural features of wall 20 previously described and has a series of windows 54, 54 corresponding to the windows 55 in the mentioned wall 20, and also resembling the latter in having a wheel box or well 23 similar to the wheel box or well 21 of wall 20, as already outlined. In order to cover the wheels, the walls 20 and 22 have the outer wall sheet or layer closed upon the outside of the wheel boxes 21 and 23 by means of a downward extension of the outer sheet 29 in the case of wall 20, as shown at 50, while in the case of wall 22, a plate 56 is attached to the wall 22 by screws 57, 57, so that the plate may be detached when desired. The wall 22 with its interior studs 58, 59, outer wall sheet 60 and inner wall sheet 61 of metal or plywood forms the outer wall of the telescoping or pull-out side portion generally indicated at 62. This pull-out telescoping portion includes a floor generally indicated at 63 consisting of a series of floor boards 64 supported upon the relatively light floor joists 65, a roof consisting of the outer roof portion 66 of plywood or sheet metal, the inner reinforcing strips 67 and the internal ceiling sheet 68 of sheet metal or plywood comparable to floor and the ceiling or roof portions extending to and being secured to the wall 22, first described. At the forward end of the extension or telescoping member 62 is a forward wall exteriorly having a sheet metal or plywood layer 69 and spaced within the latter the inner wall sheet 70, while rearwardly the same extension is provided with a corresponding rear wall including the outer wall sheet or surface 71, and spaced within the latter the inner wall surface 72. The previously-mentioned front wall is provided with an appropriate door frame 73 in which is fitted a door 74 with an upper glass panel 75 and conventional door knob 76', as best seen in Figure 2. Upon the inner ends of the front and rear walls of the telescoping and extensible side portion or chamber 62 is fitted an end frame 76 of which the lower horizontal portion 77 forms an end closure or frame for the floor 64, while the upper portions of frame 76 are formed into an archway 78 to improve the appearance of the interior of the trailer. Upon the sides 76 of the mentioned end frame forming the closure means for the front and rear walls are attached rubber strips or gaskets 79, while a similar rubber strip 80 secured at the upper portion of the arch serves to form a resilient cushion or stop for the inner end of the telescoping pullout side or chamber 62 when the same is extended. Further rubber side strips or battens 81 are secured upon the interior of wall 24 of the trailer about the opening 46 in said wall by the inner ends of bolts 53 and normally wiping against the outer front and rear walls 69 and 71 of the telescoping side portion or chamber 62 and the similar horizontal rubber batten or strip 82 secured to an upper horizontal strip 83 in the opening immediately below the roof rail 44 by the upper bolt 53 in effective position to seal the trailer with the upper surface 66 of the roof of the extensible portion or member 62, all of which details are best seen in Figures 6 and 7, and the rubber strips or battens described serve to provide a weather seal about the telescoping pullout side portion or chamber 62 in withdrawn or extended position thereof, and particularly with reference to the latter in order to prevent the entry of water or cold air into the trailer. Normally, the telescoping pull-out portion 62 extends with its inner end substantially to the broken line indicated at 83 in Figure 2, with the outer end wall 22 thereof substantially in line with wall 24 of the trailer proper, as also indicated in said Figure 2.

In order to facilitate pulling ou the extensible telescoping portion or inner body 62 and thereby provide an enlarged living room in the intermediate portion of the trailer, groups of rollers are provided, as will now be desrribed, so that the parts moving with respect to each other are capable of smoothly rolling by and being guided by the rollers.

The outer end of the floor 37 of the trailer, which is also provided with a horizontal rubber strip 84 secured to the longitudinal wooden strip 85, is provided with a series of upwardly-extending roller fixtures 86, 86 secured to the floor studs 38 by means of screws or bolts 87 and provided with rollers 88 directly bearing against and supporting a floor bottom 89 of the floor joists or strips 65 of the extensible floor 64, 63 and supporting the floor boards 64 of the telescoping member 62. In corresponding manner, the series of inwardly-extending roller fixtures 90 are secured by bolts 91 beneath the floor boards 64 of floor 63 in the extensible member 62 with rollers 92 rolling directly upon the floor boards 37 of the lower floor of the trailer proper, as partly shown in Figure 2, but better shown in larger detail in Figure 3. In Figure 4, are illustrated upwardly-projecting roller fixtures 93 secured to the inner frame 76 of the telescoping or extensible member 62 with rotatable rollers 94 engaging against the lower edge of the roof rails 44 of roof frame 45, the intermediate portions of these rails being reinforced by the upper longitudinal peak bracing member 95 to stiffen the rails, while at the corners adjacent the fixtures 93, as best seen in Figure 5, are secured additional roller fixtures 96 with rollers 97 rolling against the side rails 98 of the raised roof portion 43 immediately beneath the frame 45 thereof. As best seen in Figures 4 and 5, it may be noted that the first-mentioned rollers 94 engage directly against the lower edges of the rails 44 to cooperate with the lower rollers 88 and 92 beneath the floor, while rollers 97 engage against the sides in such fashion as to laterally guide the pull-out side portion or extensible member 62 while being extended. As also shown in Figure 8, corresponding rollers at the bottom side of the opening 46 in the outer wall 24 of the trailer proper, as indicated at 99, 99 in fixtures 100 secured to the trailer, also serve to guide the extensible member 62 laterally during outward movement thereof, rolling against the sides of the same.

For the purpose of supporting the entire outer portion or end which normally forms the side of the trailer when extended, additional rollers are provided which are extensible from the lower portion of member 62, as will now be detailed. Within the wall 22 are disposed two narrow wheel wells, generally indicated at 101 and best seen in Figures 9 to 12, each wheel well being normally closed outwardly by a door 102, and as both are alike, the description of one will suffice to describe the other. Each door 102 is hinged at 103 to the wall 22 and provided with a latch 104 which when released will allow the door to be opened in order to provide access to the interior. Each wheel well 101 primarily consists of a box having a rear wall 105, side walls 106, 106 and a top 107, the box being interiorly reinforced by a pair of laterally-extending rear bars or joists 108, 109. The sides are reinforced by the vertical studs 110, 111 (Figure 9). The top 107 is secured at the forward end to the horizontal wall joist 59 within the outer wall member 60 of wall 22, while at the lower end the rear wall 105 of the box is secured to the floor of the extensible member 62 by the interior transverse joist or bar 109 secured thereto, being in turn secured upon the floor joists 65, the only desideratum being that the wheel well 101 in each case shall be firm and contribute to the durability of the structure as a whole. Within the confines of the side walls 106, rear wall 105, the floor base 65 is reinforced by the provision of a rather heavy floor 112 in which a slot 113 extends from the outer end 114 a limited distance inward to provide for the upwardly-extending arms 115, 115 of a pair of brackets 116, 116 virtually forming angle members which have their lower horizontal arms 117, 117 secured beneath the floor 112 by means of bolts 118, 118. Intermediately between the outer end 114 of the floor 112 and the inner end of slot 113, this slot is widened at 119 to provide clearance for a downwardly-swingable wheel support generally indicated at 120 having a shank 121 pivoted at the end thereof to the upper ends of the upwardly-extending spaced arms 115 of fixtures 116 by means of a transverse pivot bolt 122. The mentioned wheel fixture includes at the other end of the shank 121 a hydraulic cylinder 123 and a hydraulic pump cylinder 124 operated by a lever 125 pivotally connected at 126 to the hydraulic pump plunger 127 and pivotally mounted upon the hydraulic jack casing 123 by a pivot pin 128. Within the cylinder 123 is a hydraulic jack plunger 137, made rigid with the jack frame 129 which is provided with a pair of bearing supports 130, 130 forming a yoke for supporting the axle 131 of a wheel 132. Normally, while the pull-out side portion or telescoping chamber member 62 is in its withdrawn and telescoped condition with respect to the trailer proper, the wheel fixtures 120 are, of course, out of action and are then disposed in vertical position, as shown in Figures 10 and 11, and as the bolt 122 supporting the shank 121 between the arms 115 is capable of being tightened by means of nut 133, it is, therefore, held normally by friction between the arms 115 in an upright condition until it is desired to lower the wheel 132 into contact with the ground.

Figure 11:
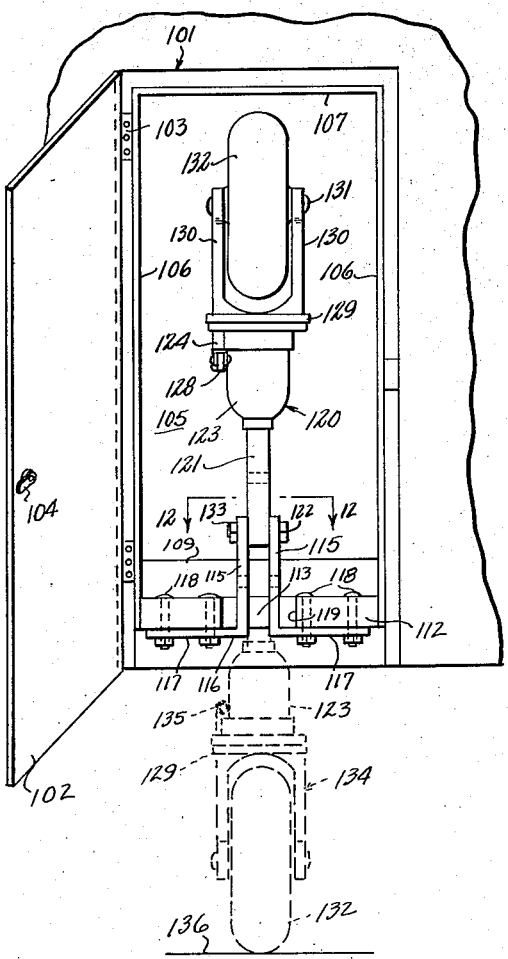
Figure 11 is a side elevation of the same mechanism shown in Figure 10, as seen from the right when a door is open to expose the supporting wheel to view.
Figure 12:
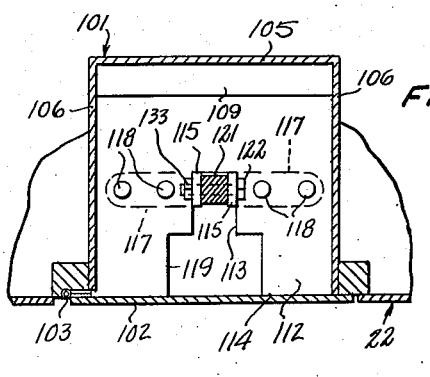
Figure 12 is a transverse section taken on line 12—12 in Figure 11.

As readily seen in said Figures 10 and 11, if the nut 133 is released after opening door 102, it is possible to swing the wheel fixture downward into the position indicated in broken lines 134. As especially shown in Figure 10, an operating handle indicated in broken lines at 135 may then be inserted into the handle or operating lever 125 on cylinder 123, and when this handle 135 is operated, thereby operating the lever 125 of the hydraulic pump, the jack portion 129 supporting the wheel will extend the latter down into contact with the ground at 136. Such extension of the wheel downward will expose the erstwhile concealed hydraulic plunger 137, as best shown in Figure 8.

The arrangement is such that when the trailer 14, shown in Figure 1, is stopped at a desirable location, and it is desired to increase the available space in the intermediate portion of the trailer to provide an enlarged living room, for example, the first step is to release the wing nuts 52, 52 from the bolts 53, so that the sealing frame consisting of the flat strips or plates 47, 48 and 49 are released from side wall 24 of the trailer. Then the plate 56 is removed by removing screws 57, 57 and the two near wheels 15, 15 also removed after blocking up the spring-and-axle structure 16 thereof with blocks 137 (Figure 2). Then the two doors 102 are opened and the pivot bolt nuts 133 released and the two wheel fixtures 120 swung down into the position indicated in Figures 10 and 11 at 134, and the nuts again tightened so that the wheel fixtures are firmly held in the downward position. The handles 135 are then inserted in the operating levers 125 of the hydraulic pump of both wheel fixtures 120 and the pumps operated until the wheels 132 come into contact with the ground 136 so that they tend to lift and at least fully support the outer end of the pull-out side or telescoping chamber member 62. Thereafter, the latter member is pulled, or rather rolled out, on wheels 132, 132 into fully extended position, the walls and floor, as well as ceiling or roof being guided and supported by the side rollers at the top 97, the bottom rollers 99, the floor rollers 88, 92 which are staggered with relation to each other in order to avoid contact of one set of rollers with the other, and also the upper roof rollers 94. When the pull-out side or extensible telescoping chamber member 62 has thus been extended until the frame portions 76, 76, 77 and arch 78 come to rest with rubber strips 79, 80 engaging against the side surfaces of the rubber strips 81, 82, etc., when it will be noted that the additional space added to the intermediate portion of the trailer 14, as best seen in Figure 2, will almost double the width thereof and virtually provide a square living room from which the door 74 leads forwardly to the outside, while the wall 20 in the rearward portion of the trailer may also have a door therein if so desired. In order to insure that the extended portion 62 remains in its extreme extended position, the wheels 132 may be blocked in the inward direction by wedges until it is intended to telescope the projecting chamber portion 62 and drive off with the trailer. In the meantime, the main wheels 15 which have been removed may be stored in the luggage trunk of the automobile connected to the trailer.

When the trailer is to be transported to another location, the wheels 132 are first freed from any blocks or obstructions and the entire projecting portion or pull-out side member or chamber 62 is then rolled into its telescoped relation with the trailer 14 until the outer sealing or closure strips 47, 48, 49 upon the wall 22 thereof engage against the side wall 24 of the trailer when the wing nuts 52 are again replaced upon the bolts 53 secured to the wall 24, the wheels 15 are then replaced on their axles to support the axle-and-spring structure 16 at the right side and the plate 56 replaced in position to partly cover the mentioned wheels with the screws 57, 57 again holding the plate. The blocks 138 are then removed and doors 102 opened and nuts 133 released so that the hydraulic wheel fixtures 120 may again be swung up into vertical position, as shown in Figures 10 and 11, and the nuts 133 then tightened again to hold the shank 121 rigidly vertical between the arms 115, after which the doors 102 are again closed and the latches 104 secured, when the trailer will be immediately in form to proceed and be drawn by the automobile connected thereto by the hitch 19.

The forward portion of the trailer having the window 139 may serve as a kitchen, while the rear portion contiguous to the rear wall 26 may serve as a bedroom if so desired. In this connection, it is to be noted that either or both of the front or rear portions of the trailer may be made extensible so as to pull out instead of the one side as shown and described, or both sides may be extensible, if desired.

The wall structures described may, of course, be modified by making them entirely of metal instead of having any portion thereof of wood, without departing from the spirit of my invention. Again, while I have described hydraulic jacks for controlling the positions of wheels 132, obviously screw jacks may be used which are manually, mechanically, or electrically operated.

Manifestly, other variations may be resorted to and parts and features may be modified or used without others within the scope of the appended claims.

Having now fully described my invention, I claim:

1. In an automobile trailer, a mobile outer trailer body provided with a rectangular opening in one side wall thereof, an inner trailer body positioned within said outer trailer body and mounted in the latter for extensile movement with respect to said one side wall, said inner trailer body including a side wall normally disposed in coextensive relation with respect to said one side wall of said outer trailer body, there being a pair of side by side spaced wheel wells provided in said inner trailer body opening into the bottom and said one side wall thereof, a wheel positioned within each of said pair of wheel wells and mounted therein for rocking movement to an extended position for supporting said inner trailer body, a sealing frame normally overlying the marginal edge of said side wall of said inner trailer body and the adjacent bounding portions of said one side wall of said outer trailer body and detachably secured thereto, and closure means bridging each of the wheel wells and mounted on said side wall of said inner trailer body for swinging movement into and out of closing relation with respect to said wheel wells.

2. In an automobile trailer, a mobile outer trailer body provided with a rectangular opening in one side wall thereof, an inner trailer body positioned within said outer trailer body and mounted in the latter for extensile movement with respect to said one side wall, said inner trailer body including a side wall normally disposed in coextensive relation with respect to said one side wall of said outer trailer body, there being a pair of side by side spaced wheel wells provided in said inner trailer body opening into the bottom and said one side wall thereof, a wheel positioned within each of said pair of wheel wells and mounted therein for rocking movement to an extended position for supporting said inner trailer body, a sealing frame normally overlying the marginal edge of said side wall of said inner trailer body and the adjacent bounding portions of said one side wall of said outer trailer body and detachably secured thereto, closure means bridging each of the wheel wells and mounted on said side wall of said inner trailer body for swinging movement into and out of closing relation with respect to said wheel wells, and means interposed between said inner and outer trailer bodies for limiting the extensile movement of said inner body with respect to said outer body.

3. In an automobile trailer, a mobile outer trailer body provided with a rectangular opening in one side wall thereof, an inner trailer body positioned within said outer trailer body and mounted in the latter for extensile movement with respect to said one side wall, said inner trailer body including a side wall normally disposed in coextensive relation with respect to said one side wall of said outer trailer body, there being a pair of side by side spaced wheel wells provided in said inner trailer body opening into the bottom and said one side wall thereof, a wheel positioned within each of said pair of wheel wells and mounted therein for rocking movement to an extended position for supporting said inner trailer body, a sealing frame normally overlying the marginal edge of said side wall of said inner trailer body and the adjacent bounding portions of said one side wall of said outer trailer body and detachably secured thereto, closure means bridging each of the wheel wells and mounted on said side wall of said inner trailer body for swinging movement into and out of closing relation with respect to said wheel wells, means interposed between said inner and outer trailer bodies for limiting the extensile movement of said inner body with respect to said outer body, and means operatively connected to said inner and outer trailer bodies for detachably securing said inner body in its supported position within said outer trailer body.

CHARLES R. L. JOHNSON.

REFERENCES CITED

The following references are of record in the file of this patent:

UNITED STATES PATENTS

| Number | Name | Date |
|---|---|---|
| 862,573 | Mears et al. | Aug. 6, 1907 |
| 1,521,635 | Lewis | Jan. 6, 1925 |
| 1,972,415 | Anderson | Sept. 4, 1934 |
| 2,122,791 | Bollstrom | July 5, 1938 |
| 2,127,580 | Bartholowsky | Aug. 23, 1938 |
| 2,136,130 | Gorlenko | Nov. 8, 1938 |
| 2,150,615 | Sword | Mar. 14, 1939 |
| 2,225,319 | Rollo | Dec. 17, 1940 |
| 2,306,084 | Rollo | Dec. 22, 1942 |
| 2,355,663 | McGlothlin | Aug. 15, 1944 |

FOREIGN PATENTS

| Number | Country | Date |
|---|---|---|
| 243,878 | Great Britain | Dec. 10, 1925 |
| 447,229 | Germany | July 19, 1927 |
| 602,976 | Germany | Sept. 20, 1934 |